United States Patent [19]

Ruger et al.

[11] Patent Number: 4,696,567
[45] Date of Patent: Sep. 29, 1987

[54] RADIATION DETECTION METHOD

[75] Inventors: James Ruger, Hoffenheim; Wolfgang Welz, Bammental, both of Fed. Rep. of Germany

[73] Assignee: Eltro GmbH, Heidelberg, Fed. Rep. of Germany

[21] Appl. No.: 673,130

[22] Filed: Nov. 19, 1984

[30] Foreign Application Priority Data

Dec. 13, 1983 [DE] Fed. Rep. of Germany ....... 3344798

[51] Int. Cl.$^4$ .............................................. G01P 3/36
[52] U.S. Cl. ................................................... 356/28
[58] Field of Search .................... 356/28, 29; 343/457, 343/458, 461, 465, 5 CM, 5 PD; 358/43, 105, 213; 377/57, 63; 250/332, 334, 342, 370 G, 371

[56] References Cited

U.S. PATENT DOCUMENTS

| | | | |
|---|---|---|---|
| 3,511,150 | 5/1970 | Whitney et al. | 356/28 X |
| 4,028,673 | 6/1977 | Taylor et al. | 356/28 X |
| 4,167,330 | 9/1979 | Haville | 356/28 |

FOREIGN PATENT DOCUMENTS 0974272  11/1982  U.S.S.R. ................................ 356/28

OTHER PUBLICATIONS

"Image Velocity Sensing by Optical Correlation," by J. Ator; Applied Optics (vol. 5, No. 8, 8/66; pp. 1325-1331).

Primary Examiner—Stephen C. Buczinski
Assistant Examiner—Bernarr Earl Gregory
Attorney, Agent, or Firm—Handal & Morofsky

[57] ABSTRACT

A radiation detection method utilizing essentially two serial arrangements of receiving elements which are rigidly connected to a reconnaissance plane (1) and of different lengths, which yield in longitudinal direction of sight the censor angle ε and on the ground the pictorial strips (6, 6'). The pictorial strips are arranged transverse to the axis (25) of the plane and parallel to each other. The processing of the signals is such that, by scanning the two serial arrangements with a time delay, a different signal signature results only if the scanned object (2) moves during over flight, independently of whether the reconnaissance plane (1) during the measuring operation is subject to a pitch angle α and/or a side slip angle β and/or a roll angle speed. Moreover, in this way, it is also possible to independently obtain the target speed and direction.

16 Claims, 18 Drawing Figures

LONGITUDINAL MOVEMENT
DIRECTION OF FLIGHT

DIRECTION OF FLIGHT

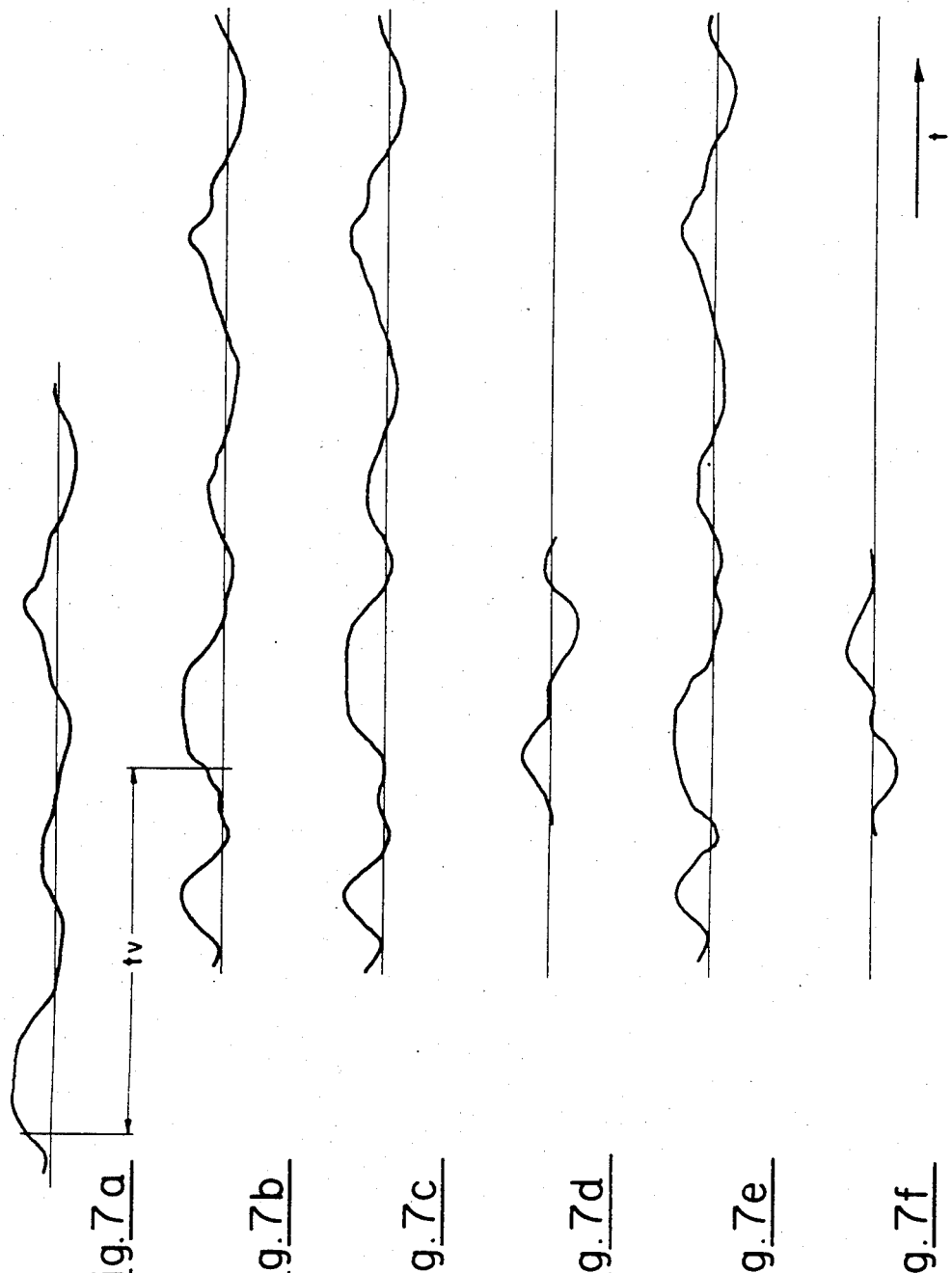

RADIATION DETECTION METHOD

BACKGROUND OF THE INVENTION

The invention relates to a radiation detection method using a line scanner, from a reconnaissance plane, by means of similar receiving elements arranged in series, which receive the radiation of the object of interest and the scene surrounding the same via objectives arranged optically in front of the receiving elements and which convert the same to electrical signals opto-electronically. The invention also relates to an apparatus for carrying out the method.

A method and apparatus of this type is known for instance from German Pat. No. 1,623,425. It discloses a so called infrared line scan system in which the individual receiving elements are successively interrogated by only one serial arrangement. This method is primarily suitable for targets at rest. For vehicles, however, the time passing between the point of observation and the firing of a weapon, on the one hand, and the time of flight of the shell, on the other hand, can only be taken into consideration approximately, by relatively inexact allowances.

The textbook "Korrelationstechink" by Wolfgang Wehrmann, et al, Volume 14, second edition, Expert Verlag, pages 159-160, teaches a method of the deriving from the surface or temperature structure of incandescent rolled stock two signals of stochastic nature and from the cross correlation function the time displacement of the two signals with respect to each other, thus obtaining a measure of the speed.

It is an object of the present invention to improve the method of the above mentioned type so that the observation of even a moving object yields exact information about the amount of the speed and direction of movement.

SUMMARY OF THE INVENTION

This object is achieved in accordance with the present invention by scanning, during flight over the object of interest, the object and the scene after the first scanning operation, again in a second scanning operation by the receiving elements arranged in series, or an appropriately designed CCD (charge coupled device) picture sensor with receiving elements of the same type and arranged parallel to the first, for a second CCD picture sensor; and by vectorially determining from the signals of the two scanning operations of the receiving elements arranged in series, or the CCD-picture sensors, a possible movement and the speed of the object of interest.

The scanning strips arranged in parallel make it possible to scan one and the same object of interest and the fixed scene twice, one after the other, with a time delay corresponding to the distance. By subsequently bringing the resultant pictures into alignment with each other by means of the correlation and substracts the second picture from the stored first picture, one obtains the value zero if, in the time span of overflight, no displacement has taken place. If, on the other hand, a movement took place, a differential signal is obtained.

The use of additional sensors for the altitude H above ground, the pitch angle α and the roll angle γ, makes a self-sufficient operation of the mult-function-sensors possible.

BRIEF DESCRIPTION OF THE DRAWING

The invention is illustrated in the attached drawings, in which:

FIG. 7 illustrates video signals of a channel corrected by a side slip angle, with a moving target in the direction of flight and opposite thereto, respectively.

DETAILED DESCRIPTION OF A PREFERRED EMBODIMENT

Figure 1:
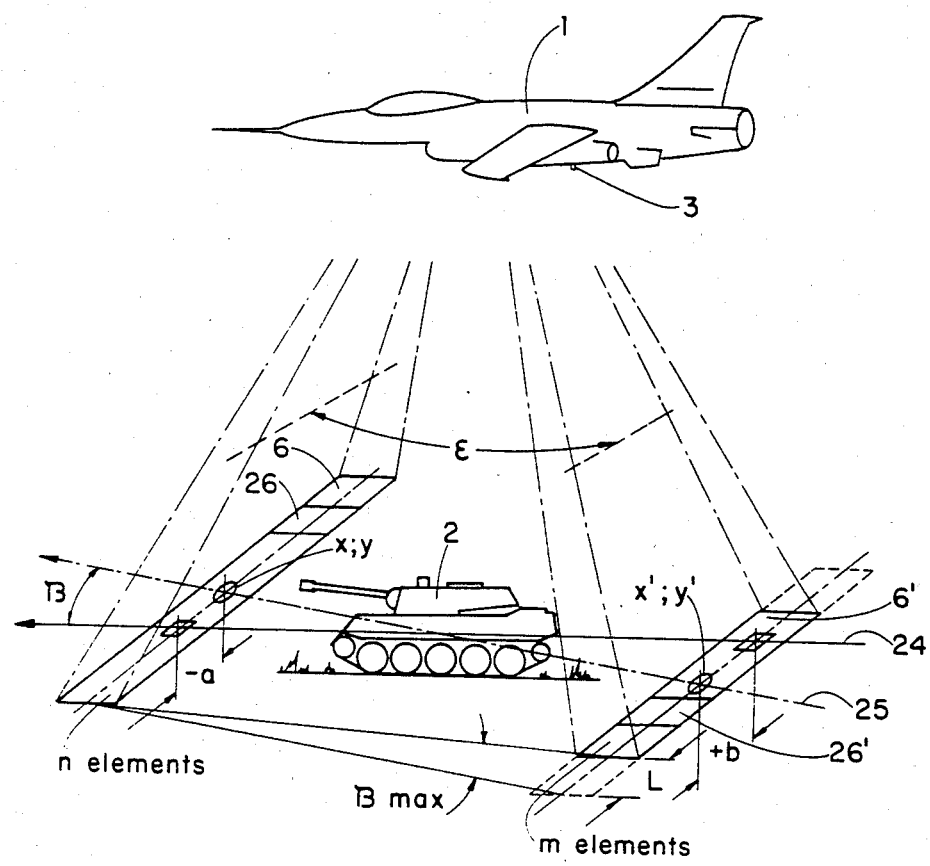
FIG. 1 is a diagramatic representation of the measuring method according to the invention, from a plane.

Referring to the drawings in detail, FIG. 1 illustrates a reconnaissance flight body, in this case, a plane 1 flying over an object of interest, in this case, a tank 2. The latter stands out from its surroundings because of its radiation signature which is utilized by the plane for the measuring method according to the present invention.

For this purpose, the bottom side of the plane is provided with a sensor-system 7, 7' (FIG. 3) covered by the body of the plane. It consists either of two similar receiving elements arranged in series or of two correspondingly built charge coupled device (CCD) picture sensors. These are special semi-conductor building blocks which, however, are commercially available. The scene and the object are scanned strip-like and time-displaced transverse to the axis 25 of the plane. The example shows the bottom side illustration 6,6' or 26,26' respectively of the sensor system which, in the front area of the plane, consists of a serial arrangement 7 with n receiving elements, and, in the rear area of the plane, of a serial arrangement 7' with m receiving elements. In other words, the ground surface overflown by plane 1 is scanned in a strip-like manner and with a relative time delay by means of the two serial arrangements 7 and 7' of receiving elements. The resultant picture strips 6 and 6' are divided into n or m picture elements of the same solid angle, and the longitudinal directions of view of the two serial arrangements of receiving elements are off-set with respect to each other by the constant plane sensor angle ε, with the apex in the sensor. It follows from this, that a stationary tank is registered by the serial arrangement 7 with the coordinates x, y−a and the same tank location by the serial arrangement 7' with a time delay with the coordinates x', y'+b, because of the resultant side-slip angle (equalling the vectorial sum of the side-slip angle and the median roll angle speed.) FIG. 1 also shows, by means of the two arrows pointing in the direction of flight, the plane movement vector 24 and the plane axis 25. The delayed signals of the individual receiving elements of the serial arrangement 7 are correlated with the non-delayed signals of the serial arrangement 7' in the longitudinal (time) axis and the transverse axis, relative to the direction of flight, until they match to a maximum degree. The time which passes until the signals of the serial arrangement receiving element 7 match the momentary signals of the arrangement 7' is a measure of the speed of the plane over ground.

Figure 2:
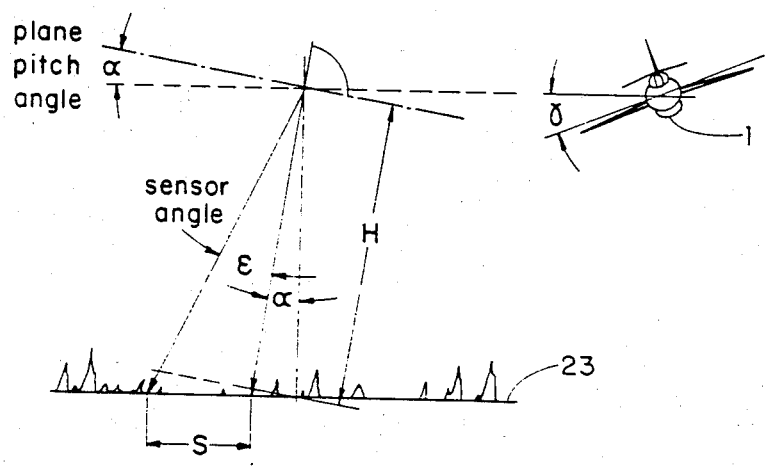
FIG. 2 illustrates the angles to be considered during the measuring method according to FIG. 1.

FIG. 2 illustrates that when taking into consideration the altitude H above ground, the pitch angle $\alpha$ of plane 1 and the distance S resulting from the angle $\epsilon$ the speed above ground $v_g$ can be determined as follows:

$$S = H \times \cos \alpha [\tan (\epsilon + \alpha) - \tan \alpha] \quad (1)$$

The speed above ground, $v_g$ is the product of the delayed time $t_v$ and S:

$$v_g = t_v \times S \quad (2)$$

Because of the transverse offset of the signals of the receiving element series arrangement 7' up to the best correlation, the resultant side slip angle $\beta$ visible from FIG. 1, is determined. If one assumes P to be the number of receiving elements in the series arrangement 7' which corresponds to the signal displacement or offset, and $\theta$ represents the angle of the field of vision, in rad, of the individual receiving element, th result is:

$$\tan \beta = S_{trans}/S = P \times \theta \times H/S \quad (3)$$

As shown in FIG. 1, as soon as the plane 1 flies over the tank 2 moving in the direction of flight, the momentary delay time $t_v$ is changed momentarily by $\Delta t_v$. Substituting now in equation (2) $\Delta t_v$ instead of $t_v$, the speed of the tank in longitudinal direction can be determined. If the tank also has a speed component in transverse direction, the P-value momentarily changes by $\Delta P$. Substituting in equation (3) $\Delta P$ instead of P, one obtains the section $\Delta S_{trans}$ in the time $t_v + \Delta t_v$) in which $\Delta P$, $\Delta t_v$ and $\Delta S_{trans}$ carry a plus or minus sign. This then results in:

$$v_{trans} = S_{trans}/(t_v + \Delta t_v) \quad (4)$$

The altitude above ground H in equations (1) to (4) can, for instance, be determined by a standard radar installation of the plane. However, because of the limited resolution capacity and the large transmitter beam angle, radar is unsuitable for determining the exact momentary altitude. Instead, as shown in the block diagram of FIG. 3, a laser altimeter 16 is used which is characterized by a high distance resolution, narrow focusing and an exact orientation capability. The pitch angle $\alpha$ (FIG. 2) and the roll angle are preferably determined by a compass 17 of the navigational system of the plane, and are fed to a control computer interface unit 18 (FIG. 3) of a multi-function sensor 3. By taking the roll speed into account, the correlation period can be shortened. The use of the laser altimeter 16, and the compass 17, assures a fully self-sufficient operation of the multifunction sensor 3.

Figure 3:
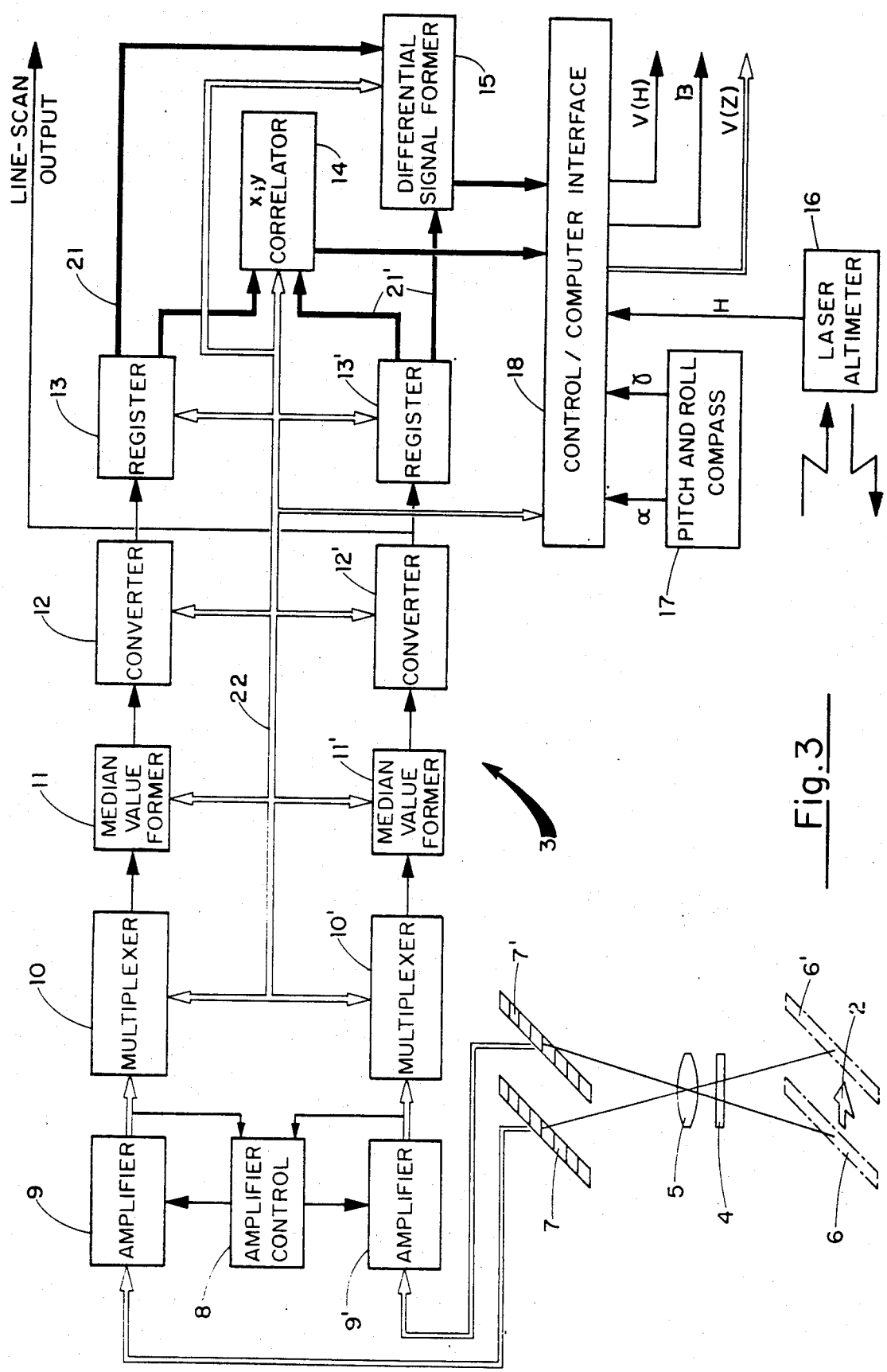
FIG. 3 is a block diagram illustrating the evaluation of signals, or the correlation between the two pictures scanned one immediately after the other, of one and the same scene.
Figure 4:
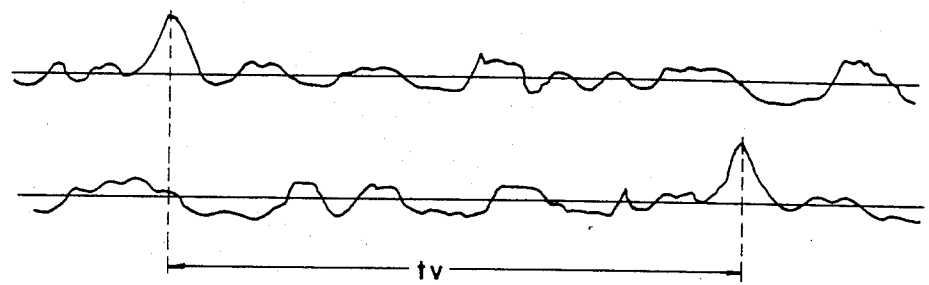
FIG. 4 is a functional scematic of the registers used during the measuring process according to FIG. 1.
Figure 4:
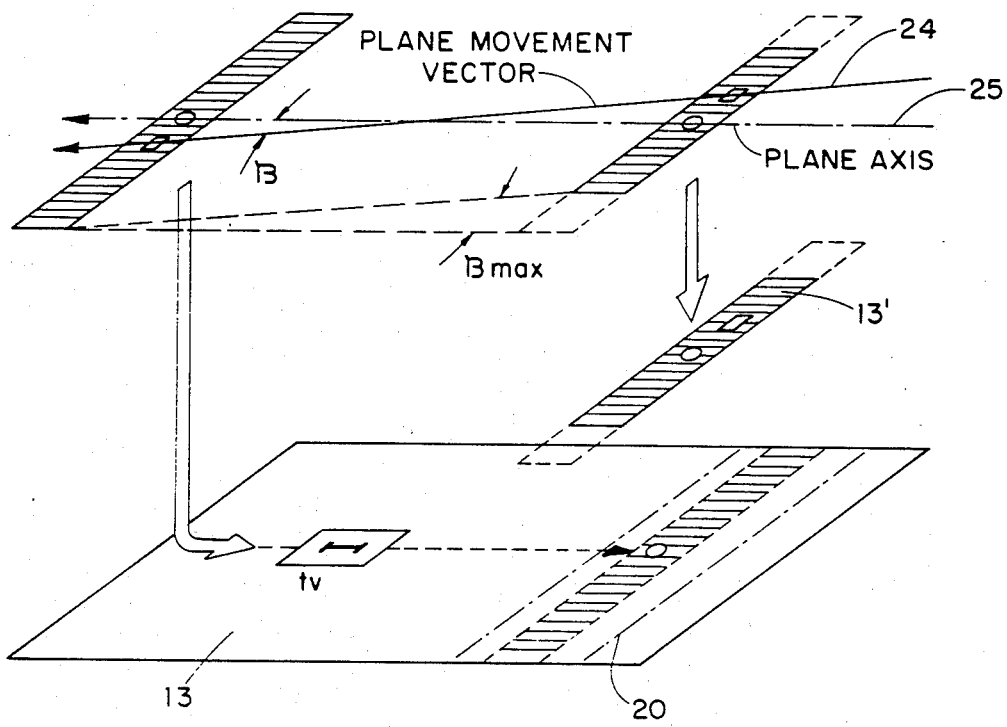
Figure 5A:
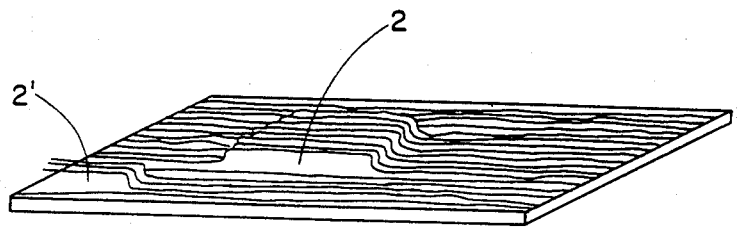
FIG. 5 illustrates the differential signal occuring during measuring according to FIG. 1, with a target moving in the direction of flight.
Figure 5B:
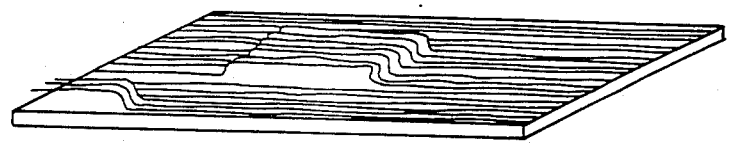
Figure 5C:
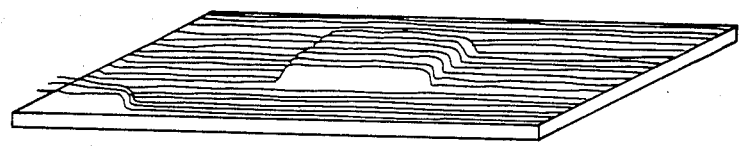
Figure 5D:
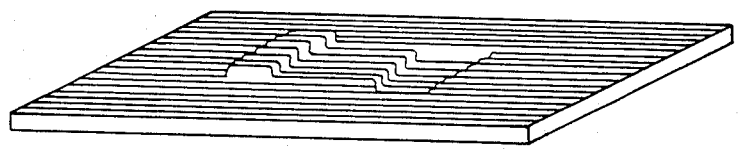
Figure 6A:
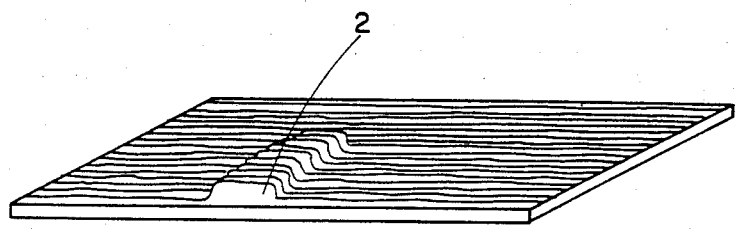
FIG. 6 illustrates the differential signal occuring during the measuring process according to FIG. 1, with a target moving transverse to the direction of flight.
Figure 6B:
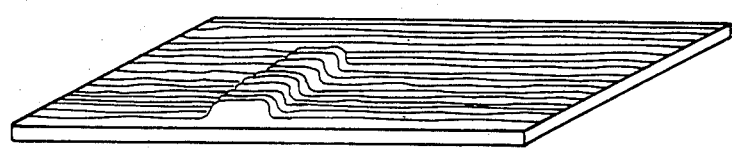
Figure 6C:
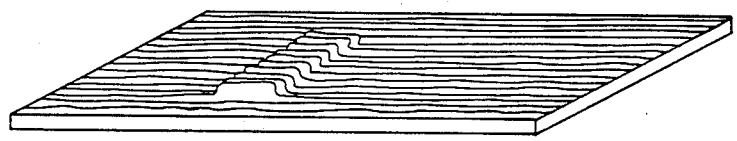
Figure 6D:
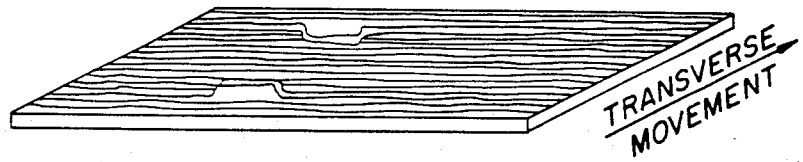

In detail the block diagram of FIG. 3 clarifies the following functional procedure:

The tank and its direction of movement is symbolized by the arrow 2, the radiation emitted by the tank reaches the series arrangements 7 and 7' of receiving elements via a common interference filter 4 and a likewise common objective 5. The bottom side scanning strips 6 and 6' of these series arrangements are indicated by dot-dash lines. In another embodiment, not illustrated in the drawing, it is, of course, possible to provide each series arrangement of receiving elements with a separate interference filter for improving the signal/noise conditions and to provide a separate objective. The signals output by the series arrangements are amplified in pre-amplifiers 9 and 9' and are passed on to the multi-plexers 10 and 10'. A control device 8 common to both pre-amplifiers and arranged between their outputs and a respective separate input, controls their amplification with high synchronization accuracy, depending on the "evaluated" signal amplitudes in order to assure an optimum sensitivity of the system. "Evaluated" in this connection, means that the signal amplitudes are calculated not linearly but according to a given function. The signals interrogated via the multiplexers 10 and 10' are passed on to mean value calculators 11 and 11' within the time interval of interrogation. Thereafter, an analog/digital conversion takes place in the analog/digital converters 12 and 12' so that, subsequently, porcessing via digital components is possible. Thereafter, a different processing of the signals takes place in the two channels 7 to 12 and 7' to 12' respectively. As evident from FIG. 4, those in analog/digital convertor 12, are continuously input in the form of a band into a shift register 13 and placed in intermediate storage. The top curve in FIG. 4 represents the signal at the exit of convertor 12 and the lower curve that at the exit of convertor 12', plotted over time t. The number of band signatures to be stored maximally corresponds to the maximum delay time $t_v + \Delta t$ divided by the band scanning interval.

By contrast, the signals converted by the analog/digital converter 12', are put into intermediate storage in register 13' only for one band scanning interval. Within the time interval of registers 13 and 13', a two-plane correlation is carried out in unit 14 (FIG. 3) common to both channels 7 to 12 and 7' to 12', respectively. The amount of data to be correlated is limited by setting a two-dimensional data window 20 (FIG. 4), depending on the range of speed, altitude, pitch angle, and resultant slide slip angle of the plane, as well as on the vectorial target speed range is set, and that, in addition, by optimizing the location of the correlation window in transverse direction via the roll speed.

The coordinates x, y of the best possible correlated picture elements of channels 7 to 13, together with the actual data of channels 7' to 13', are fed from the two-plane correlator 14 to the control computer interface unit 18. These data are averaged over a predetermined time interval because of temporary V (H) measuring errors due to movable targets. Since, as has been mentioned already above, information regarding the altitude, pitching, and rolling angles reach the control computer interface unit 18 via the compass 17, the exact above ground speed of the plane can be determined.

By simple subtraction of the amplitude values of the best possible correlated picture elements of channels 7 to 13, and the associated channels 7' to 13', in this way, always a differential signal signature is obtained when an object flown over has moved in between these scanning operations. From the course of this differential signal signature over time, while making use of the directly obtained above ground speed and altitude, the real vectorial speed of the tank can be calculated.

In order to determine also the side slip angle $\beta$ shown in FIGS. 1 and 4, the serial arrangements 7 and 7' may be composed of a different number of receiving elements. Preferably, the number of elements in serial arrangement 7 is larger than that in 7'. In these figures, L designates half the difference in length.

FIG. 5 assumes an increase in the signal of the tank compared to its environment. This corresponds, for instance, in the infrared range, to a higher radiation or temperature of tank 2 and of a building designated with the reference numeral 2', compared to the environment. The course of the differential signal, first negative and then positive, the plus or minus sign of the speed component of the tank in the direction of flight is given. In detail, in FIG. 5a, the non-delayed signal of channel 7 to 12 is illustrated. FIG. 5b shows the same signal which, however, has been delayed by the shift register 13 (FIG. 4). In FIG. 5c, there is shown the signal of channel 7' to 12', which is scanned slightly later. One recognises that the position of the tank 2 relative to building 2', in the direction of view, has changed towards the right picture margin. From FIG. 5d the differential signal signature is evident in which from the delayed signal of the first mentioned channel, the momentary signal of the other has been subtracted.

Similar comments apply to FIG. 6, which represents the differential signal, if the tank 2 has moved transverse to the direction of flight. Also, in this figure, it is evident that the course of the differential signal determines the sign (+ or −) of the transverse speed component of the tank.

FIG. 7 shows the video signals of the channel corrected with the resultant slide slip angle $\beta$ for a tank which moves in the direction of flight, or opposite thereto. The differential signal signature of a tank at rest is equal to zero. In FIG. 7a, again, the non-delayed signal is shown, and in FIG. 7b, the signal delayed by the interval $t_v$ and corrected with the resultant slide slip angle of channel 7 to 12. FIG. 7c, on the other hand, shows the signal of channel 7' to 12' is subsequent in time. The course of the signal curve shown in FIG. 7d, which first is positive and then negative, leads to the conclusion that the movement of the tank took place in the direction of flight. The time interval between the signal which is first positive and then negative, is $+\Delta t_v$ and thereby, proportional to the speed component of the tank in the direction of flight.

On the other hand, if the curve of the delayed signal of channel 7' to 12' is as shown in FIG. 7e, a differential signal occurs between curves 7b and 7e, as evident from FIG. 7f. One recognizes the course of the curves, first negative and then positive, in comparison to FIG. 7d. The time interval of the first negative and then positive course of the signal is now $-\Delta t_v$ and gives a tank movement opposite to the direction of flight and with a speed component proportional to $-\Delta t_v$.

Similar to FIG. 7, other video signals for determining the transverse speed of a tank can be illustrated. In this cases, instead of $\Delta t_v$, only that number of receiving elements of serial arrangement 7' is determined which extends over the width of the positive or negative signal curve, according to FIG. 7d. The transverse speed component of the tank can then be calculated from the equations (3) and (4), the sign (positive or negative) is predetermined by the polarity course of the curve of the differential signal.

In a manner known per se, the vectorial speed can be determined from the longitudinal and the transverse speed components.

The signals scanned by the multiplexers 10 and 10' of the serial arrangements 7 and 7' of the receiving elements can also be used for a line scanner for a picture or a scanning pattern of the ground.

We claim:

1. A method of detecting radiation of a moving object from a reconnaissance flight body, comprising the steps of:
    flying over the moving object and surrounding scene with the reconnaissance flight body;
    measuring the altitude of the flight body over ground with a laser altimeter, and the pitch angle and roll angle of the flight body with a compass of the navigational system of the flight body;
    during over-flight, first scanning the object and scene with first radiation receiving means;
    then scanning the object and scene with a second radiation receiving means offset parallel to and of similar type than said first receiving means;
    said first and second radiation receiving means being respectively a serial arrangement of first and second receiving elements;
    setting the amount of data to be correlated depending on the range of speed, height, pitch angle and resulting slide slip angle of the flight body, and depending on a target speed by means of a two-dimensional correlation window;
    placing the signals of said first radiation receiving means in parallel storage, correlating the stored signals of the first radiation receiving means with the arriving signals of the second radiation receiving means longitudinally and transversely in relation to an axis of said reconaissance flight body, forming a differential signal signature, registering said signature, and evaluating the same.

2. A method according to claim 1, comprising the step of continuously actualizing the speed and altitude of the flight body by previously measured data.

3. The method according to claim 1, comprising the step of optimising the position of the correlation window transverse to a flight body axis by a roll angle compass.

4. A method according to claim 1, comprising the step of averaging the correlated signals.

5. The method according to claim 1, comprising the step of calculating from the course of differential signals over time, and from the immediately previously determined above ground speed and altitude above ground of the flight body, the real vectorial speed of the object on the ground.

6. The method according to claim 5, comprising the step of determining the polarization course of the differential signal and from said course determining the sign of the target speed vector.

7. The method according to claim 1, comprising the step of detecting the moving object and surrounding scene twice in one of the following ranges: infrared, visible or ultraviolet, and processing the signals in one of the following forms: analog, digital, or analog/digital.

8. A system of detecting radiation of a moving object comprising: two substantially similar strip-like radiation receiving means mounted transverse to a longitudinal axis of the flight body in spaced, parallel relationship to each other, means for dividing picture strips detected by said receiving means into picture elements of equal spatial angles, the arrangement being such that said two radiation receiving means form a constant acute angle in the direction of view of said receiving means for detecting movement of said objects; a laser altimeter for measuring the altitude of the flight body over ground; a compass for measuring the pitch angle and roll angle of the flight body; said radiation receiving means being serial arrangements of radiation receiving elements, one of said arrangements having a viewing field width different from that of the other; one of said radiation receiving means having a larger number of picture elements than the other, and said picture elements being arranged symmetrically with respect to the longitudinal axis of the flight body.

9. A system according to claim 8, wherein said radiation receiving means are charge-coupled picture sensory devices.

10. A system according to claim 8, comprising an objective arranged separately in front of each radiation receiving means.

11. A system according to claim 10, comprising an interference filter in front of said objective.

12. A system according to claim 8, wherein a common objective is arranged in front of both radiation receiving means.

13. A system according to claim 8, comprising a first circuit operatively connected to one of said radiation receiving means and including in series: a controllable amplifier, a multiplexer, a mean value former, an analog/digital converter, a register, and a data bus; a second circuit operatively connected to the other radiation receiving means and including in series: a controllable amplifier, a multiplexer, a mean value former, an analog/digital converter, a register, and a data bus; a two-plane correlator operatively connected to said first and second circuits and having an output; a common differential signal former operatively connected to said first and second circuits and having an output, and a control computer interface unit operatively connected with said outputs of said differential signal former and of said correlator.

14. A system according to claim 13, comprising a control device operatively connected to the inputs and outputs of said amplifiers in said first and second circuit.

15. A system according to claim 13, wherein said control/computer interface unit has an output, and a control bus operatively connecting said output of said unit with said multiplexers, mean value formers, analog/digital converters, registers, two-plane correlator and said differential signal former.

16. A system according to claim 13, wherein said control computer interface unit is operatively connected to said altimeter and said compass.

* * * * *